E. C. EVERETT.
LANTERN.
APPLICATION FILED SEPT. 28, 1907.
951,420.
Patented Mar. 8, 1910.
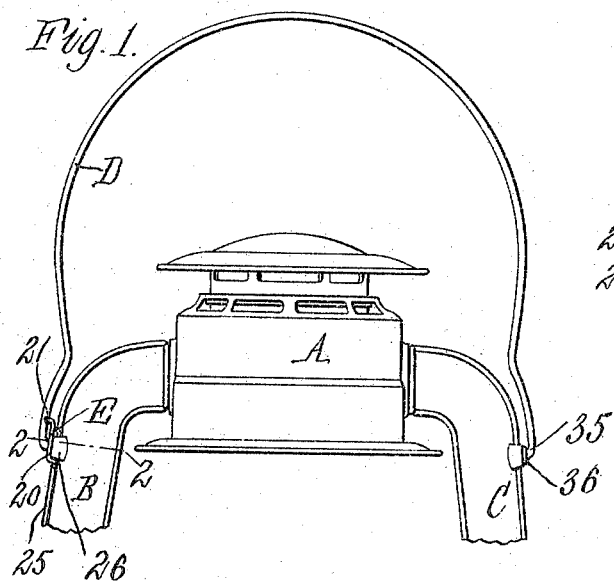
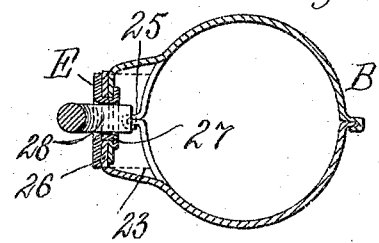
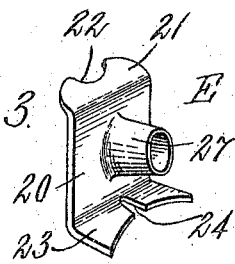
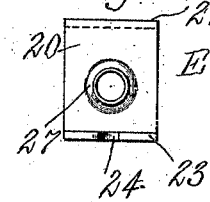
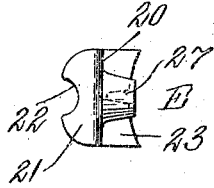
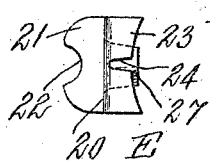
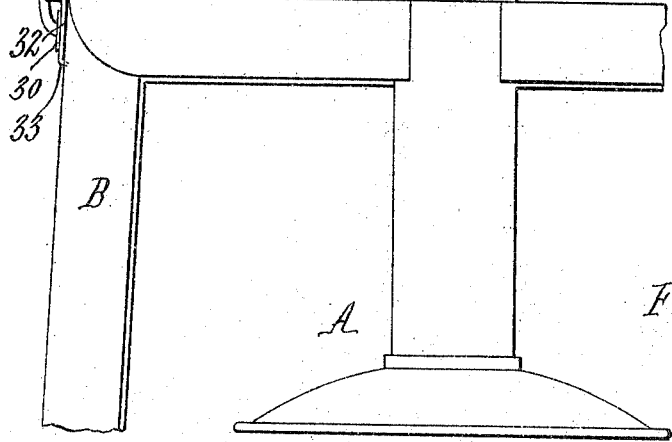
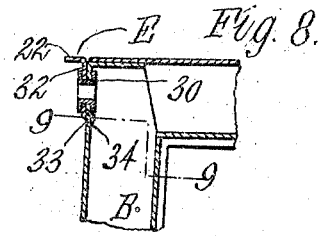
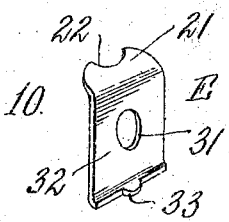
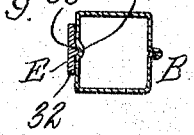
Witnesses:
A. G. Dimond.
E. A. Volk.
Inventor
Ernest C. Everett
By Wilhelm, Parker & Hand.
Attorneys.

UNITED STATES PATENT OFFICE.

ERNEST C. EVERETT, OF NEW YORK, N. Y., ASSIGNOR TO R. E. DIETZ COMPANY, OF NEW YORK, N. Y.

LANTERN.

951,420.　　　　　Specification of Letters Patent.　　Patented Mar. 8, 1910.

Application filed September 28, 1907. Serial No. 394,941.

*To all whom it may concern:*

Be it known that I, ERNEST C. EVERETT, a citizen of the United States, residing at New York, in the county of New York and State of New York, have invented a new and useful Improvement in Lanterns, of which the following is a specification.

This invention relates to the bail holders which are provided on lanterns for holding the bail yieldingly in an upright position, and has for its object to provide a bail holder which is simple in construction, efficient and convenient in operation and which can be produced and secured in place at comparatively small expense.

In the accompanying drawings: Figure 1 is an elevation of the upper portion of a tubular lantern provided with this improved bail holder. Fig. 2 is a horizontal section in line 2—2, Fig. 1, on an enlarged scale. Fig. 3 is a perspective view of the bail holder detached. Fig. 4 is a rear elevation of the bail holder. Fig. 5 is a top plan view and Fig. 6 a bottom plan view thereof. Fig. 7 is a fragmentary elevation of the upper portion of a tubular lantern provided with a bail holder of modified construction. Fig. 8 is a vertical section of this bail holder and adjacent parts of the lantern. Fig. 9 is a horizontal section in line 9—9, Fig. 8. Fig. 10 is a perspective view of this bail holder detached.

Like reference characters refer to like parts in the several figures.

Referring to Figs. 1–6, A represents the top portion of a tubular lantern, B, C the air tubes, D the bail and E the bail holder secured to the upper portion of the tube B. The bail holder E comprises a plate or body 20 which is provided at its upper end with an outwardly projecting flange 21 having a central recess or depression 22 for holding the bail, and at its lower end with an inwardly projecting flange 23 which fits against the outer side of the tube and is provided with a notch 24 into which projects the upright rib 25 formed by the seam which unites the halves of the tube on the back or outer side thereof. The tube is provided on its outer side with a flat boss 26 formed by overlapping lips on the halves of the tube and forming a flat bearing surface for the body or plate 20 of the bail holder. This plate or body is provided on its rear side with an eyelet 27 which is formed integrally with the plate and by which the plate is secured to the tube, as represented in Fig. 2. This eyelet also forms a bushing for the opening in the boss 26 in which the pivot portion 28 at the end of the bail engages and reinforces this opening and forms a smooth bearing for the end of the bail. The bail holder is secured by the eyelet with its plate 20 against the outer side of the boss 26 of the tube and straddles with its lower flange 23 the seam on the back of the tube, whereby the plate is prevented from turning. Upon swinging the bail to an upright position the portion of the bail which is adjacent to the pivot portion springs into the holding recess 22 of the upper flange and is held therein in an upright position with sufficient security to prevent the bail from dropping down but not so rigidly that the bail could not readily be moved out of its upright position, if desired.

In the modified construction, represented in Figs. 7–10, the bail holder is secured to the tube by a separate eyelet 30 which is passed through an opening 31 in the plate 32 of the bail holder. The plate is provided at its lower edge with an inwardly projecting lip 33 which enters a depression 34 in the tube and prevents the holder from turning.

The bail holder comprising the attaching plate or body, the upper flange provided with a holding recess and the lower flange or projection which holds the plate against turning is readily formed of sheet metal and secured to the tube by the eyelet in a very simple manner. When the eyelet is formed integrally with the plate the cost of the holder is not materially increased, the connection of the eyelet with the plate is rendered stronger and more attractive, and the operation of securing the holder to the tube is considerably simplified.

Ordinarily a single bail holder is sufficient on a lantern to properly hold the bail, the other end 35 of the bail, Fig. 1, being arranged in an ordinary eyelet 36, or other bearing, but two holders may be used on a lantern, if desired.

I claim as my invention:

1. The combination with a lantern frame and a bail pivotally connected therewith, of a bail holder secured to said frame and comprising an upright plate having at its upper end a transverse flange which projects outwardly from the plate and is provided in its edge with a recess in which the bail engages when in its upright position, said plate having at its lower end an inwardly projecting transverse flange provided in its edge with a notch in which engages a portion of the frame, substantially as set forth.

2. A bail holder for lanterns comprising a plate having at its upper and lower ends transverse flanges projecting from the plate in opposite directions, the upper flange being provided in its edge with a recess for holding the bail and the lower flange being provided in its edge with a notch for engaging with the lantern frame, substantially as set forth.

3. The combination with a tubular lantern frame having on the outer side of its tube an upright flat boss, of a bail holder comprising a flat plate which is secured to the upright outer side of said boss and provided at its upper edge with a transverse flange which projects outwardly from the plate and is provided in its edge with a recess for holding the bail, substantially as set forth.

Witness my hand in the presence of two subscribing witnesses.

ERNEST C. EVERETT.

Witnesses:
FRED H. TWOMBLY,
JAMES SORIANO.